April 5, 1932. G. H. ISLEY 1,852,306

REGENERATIVE HEATING FURNACE

Filed Sept. 19, 1929  2 Sheets-Sheet 1

Inventor.
George H. Isley
By Geo. H. Kennedy
Attorney.

April 5, 1932.    G. H. ISLEY    1,852,306
REGENERATIVE HEATING FURNACE
Filed Sept. 19, 1929    2 Sheets-Sheet 2

Inventor
George H. Isley.
By Geo. H. Kennedy Jr.
Attorney.

Patented Apr. 5, 1932

1,852,306

UNITED STATES PATENT OFFICE

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

REGENERATIVE HEATING FURNACE

Application filed September 19, 1929. Serial No. 393,683.

The present invention relates especially to heating furnaces that are operated at high temperatures, such for example as soaking pit and steel heating furnaces, and in which the high flame temperatures are obtained by regenerative heating of the air that is used for the support of combustion in the furnace.

The usual arrangement of the regenerative or checker chambers in such a furnace is at the two opposite ends of the heating chamber,—and this is true not only of furnaces where the air alone is regeneratively heated, but also of furnaces where both the air and the gaseous fuel itself are regeneratively heated. Because these regenerative or checker chambers are necessarily of considerable length, this usual arrangement results in a very larger furnace structure, several times as long as the heating chamber proper, and extending in both directions from the ends of said chamber. Such great length, aside from construction and housing difficulties, involves other disadvantages in the operation and use of the furnace itself; for example, a crane or other traveling device for charging and servicing such a furnace, must operate in that part of the building which contains one or both of the regenerative chambers, and the furnace charges, on their way to and from the heating chamber must be carried over the so-located regenerator chamber or chambers of the furnace.

By the present invention a different arrangement of the regenerative or checker chambers, with respect to the heating chamber of the furnace, is effected, in that said regenerative chambers project or extend in one direction only from said heating chamber, thus to nearly cut in half the usual overall length of the furnace. Such an arrangement aside from its manifest economies of space and construction, results in many advantages of furnace operation; for example, the charging crane of such a furnace can operate more safely, and with shorter movements, because of its being relieved of the necessity for operating in that part of the building which contains one or both of the regenerative or checker chambers other and further advantages and benefits of the invention will be apparent from the following detailed description thereof, taken in connection with the accompanying illustrative drawings, in which—

Like reference characters refer to like parts in the different figures.

Figure 1:
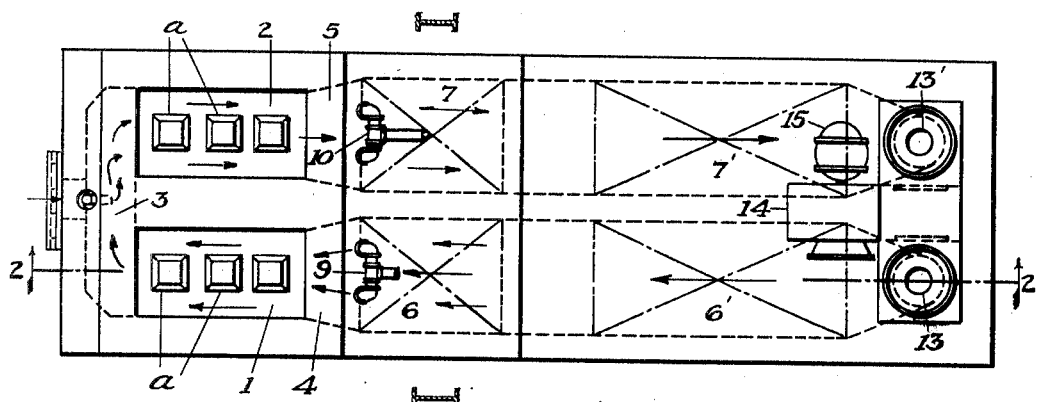
Fig. 1 is a plan view, partly diagrammatic, of a regenerative heating furnace constructed in accordance with my invention.

In the furnace of the soaking pit type shown by the drawings, the heating chamber, for the reception of the ingots $a$, $a$ or other stock to be heated, is constituted by two parallel portions 1 and 2 connected at one end by a transverse portion 3. At their other ends the portions 1 and 2 communicate by passages 4 and 5 respectively with regenerator chambers 6, 6' and 7, 7' respectively. These regenerators 6, 6' and 7, 7' are in substantially parallel arrangement, side by side, as distinguished from their usual remote arrangement at opposite ends of the furnace structure.

Figure 2:
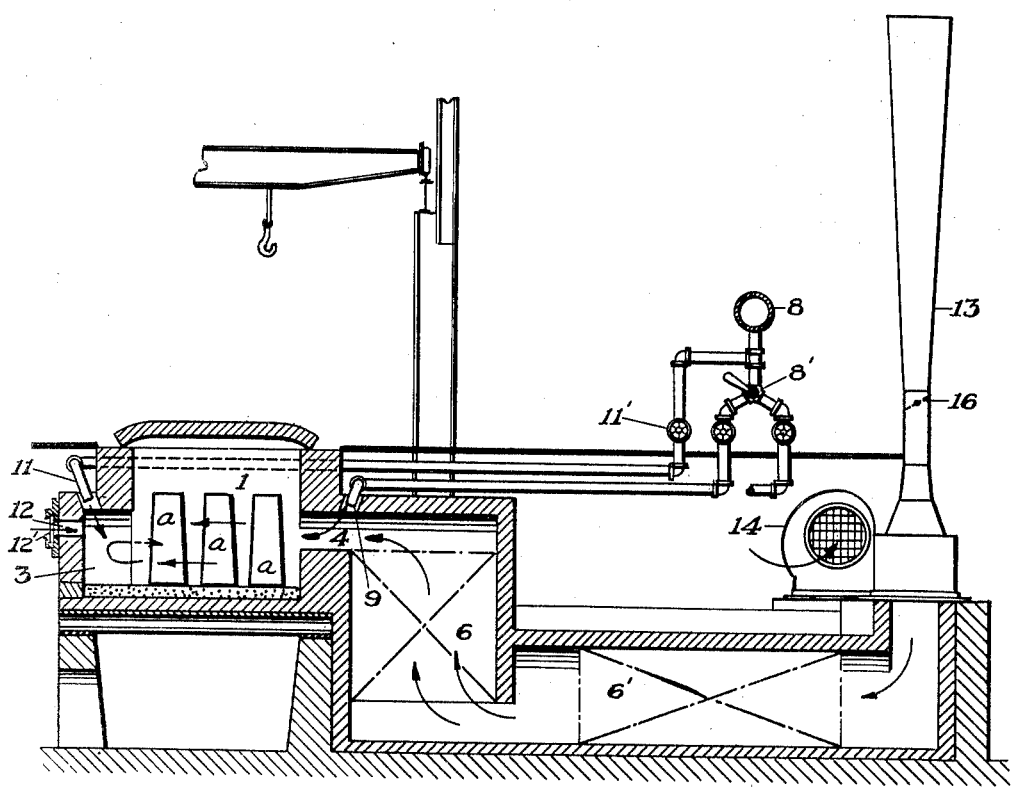
Fig. 2 is a sectional view of said furnace on the line 2—2 of Fig. 1.

In the furnace shown by Figs. 1 and 2, the fuel, such as oil, coke oven gas or the like, is supplied by a pipe or main 8, having suitable branches by which the fuel may be introduced as shown at 9 and 10 to the passages 4 and 5, and as shown at 11 to the connecting portion 3 of the heating chamber. Under these conditions, the chambers 6, 6' and 7, 7' are used for the regenerative heating of air, to support the combustion of said fuel in the following manner:—

In the operation of the furnace, as indicated by the direction arrows in Figs. 1 and 2, the major portion of the air for supporting combustion is blown or drawn in through the chambers 6, 6', and the waste furnace gases are exhausted by way of the chambers 7, 7',—and under these conditions the fuel inlet or burner at 10 is rendered inoperative. The combustible mixture formed by the air and the fuel which is admitted at 9 serves for the intensive heating of the ingots $a, a$ in the portion 1 of the heating chamber, from which the burning gases pass by way of transverse portion 3 to the other portion 2 of the heating chamber. In order to insure a sufficiently high temperature in the portion 2, additional fuel may be supplied to the heating chamber at 11, the same being ignited by the high temperature of the excess air which emanates from chamber portion 1 in conjunction with the furnace gases that have passed through said chamber portion 1. In case additional air is needed to support the combustion of the auxiliary supply of fuel at 11, as when a considerable temperature drop occurs in chamber portion 1 due to the introduction of a fresh charge of cold ingots thereto, such air may be furnished through an opening 12 in the end wall of the heating chamber. These auxiliary supplies of fuel and air are amply sufficient to quickly establish the desired high temperatures in the chamber portion 2 when the operation of the furnace is in the direction of the arrows on Figs. 1 and 2; under ordinary operating conditions, when the ingots $a, a$ or other articles to be heated in the furnace have attained relatively high temperatures, the auxiliary fuel and air supplies at 11 and 12 can be shut off, by closure of valve 11' and of damper 12', since the main supply of fuel and air, from the passage 4 or 5, as the case may be, is sufficient to maintain the desired heating effects.

To reverse such a furnace, the fuel inlet or burner at 10 is rendered operative and the fuel inlet or burner at 9 is rendered inoperative, as by suitable manipulation of a valve 8' at the juncture of the two branches,—while at the same time the intake of the main air supply is changed, from the chambers 6, 6' to the chambers 7, 7'. Under these conditions, the passage of combustion products through the furnace is in the opposite direction from that indicated by the arrows on Figs. 1 and 2, and the main supply of air which enters the portion 2 of the heating chamber by way of the passage 5 is raised to a high temperature in its travel through the regenerative or checker chambers 7 and 7', on account of the latter's previous absorption of heat from the waste furnace gases which were passing therethrough before the reversal took place. With the furnace reversed as above described, the waste gases pass out through the regenerative or checker chambers 6 and 6', the latter absorbing heat from said gases so as to transfer said heat to the entering air on the next reversal of the furnace.

The drafting of such a furnace and the alternate connection of the chambers 6' and 7' to the drafting means and to the air supply means may be effected by any well known arrangement of apparatus, such as a stack to provide natural draft, in conjunction with a suitable reversing valve for the air supply. I prefer however to use for this purpose a reversing and controlling mechanism of the type shown and described in my United States Letters Patent No. 1,635,939 dated July 12, 1927, and in my copending application, Serial No. 149,436 filed November 19, 1926, issued June 10, 1930, as Patent No. 1,762,299. Such apparatus as shown in the drawings, provides an open ended Venturi duct 13 in communication with each of the regenerator passages 6' and 7', with any suitable means, such as a blower 14, operated by a motor 15 for supplying air in upwardly directed jets to each of said ducts. Each of the latter is equipped with a suitable damper or valve 16 as shown in Fig. 2; when said damper is closed the air as supplied to the duct in question, is deflected downwardly and passes to the furnace, for support of combustion therein, by way of the regenerator chambers that communicate with the duct. When the damper 16 is opened, the air supplied by the blower 14 exerts an entraining action on the waste furnace gases, to draw them through the regenerator chambers and discharge them from the upper open end of the associated duct. When the furnace of my invention is operating as shown by the arrows in Figs. 1 and 2, the damper 16 of duct 13 is closed, while the damper 16 of duct 13' is opened; to reverse the furnace as above described it is only necessary to open damper 16 of duct 13 and to close the damper 16 of duct 13'.

It will be apparent from the foregoing that my invention provides a regenerative furnace of extreme simplicity, from a construction standpoint, and one which is not only economical in fuel consumption, but also affords a uniform heat distribution in the heating chamber and a wide range of control over the combustion processes therein. As regards even distribution of heat, it is well known that a relatively short heating chamber is preferable; my invention, in effect, provides two such short chambers placed side by side, and so connected with each other and with fuel and air supply devices as to insure at all times a substantially uniform distribution of the heat therein.

Figure 3:
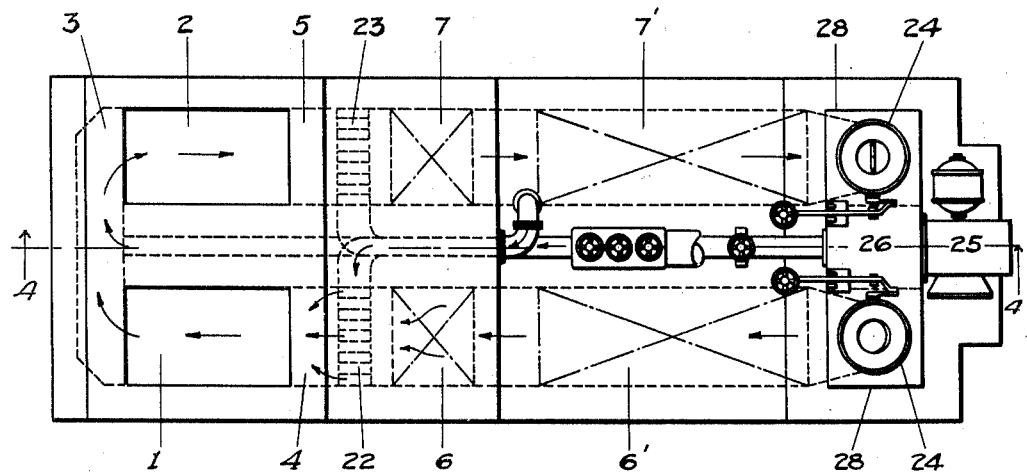
Fig. 3 is a plan view, similar to Fig. 1, of a gas-fired regenerative furnace constructed in accordance with my invention.
Figure 5:
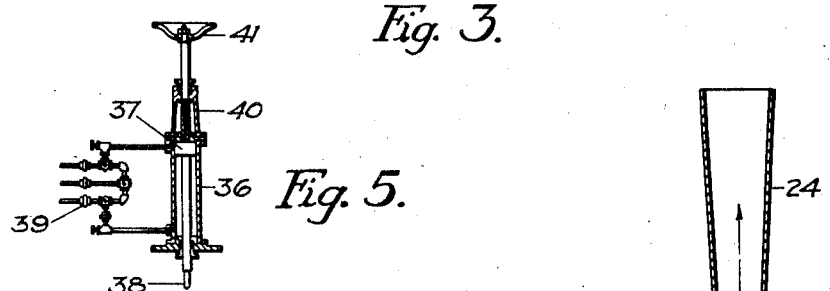
Fig. 5 is a fragmentary detail view, partly in section, illustrating certain valve operating devices.
Figure 4:
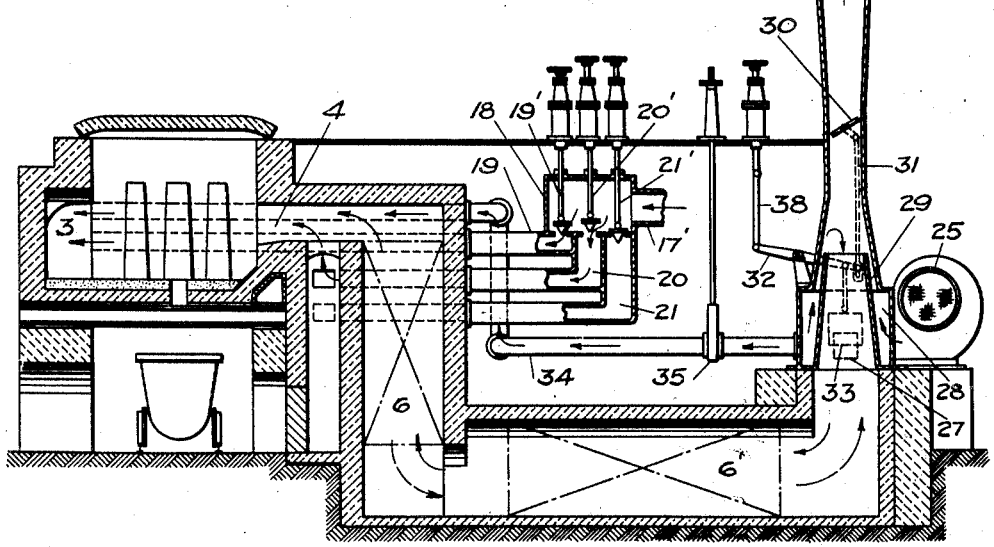
Fig. 4 is a sectional view of said furnace on the line 4—4 of Fig. 3.

Referring now to the modification of my invention shown in Figs. 3, 4 and 5, the general construction of the furnace is substantially identical with that shown in Figs. 1 and 2, and involves a heating chamber made in two portions 1 and 2, arranged side by side and connected by a transverse portion 3; at their other ends, the portions 1 and 2 communicate by passages 4 and 5 with regenerator or checker chambers 6, 6' and 7, 7', respectively.

In the furnace shown by Figs. 3 and 4, the fuel, such as producer gas, may be supplied by a pipe or main 17', connected to the interior of a valve box or inclosure 18, from which lead three branches 19, 20 and 21, the first, 19, having its outlet in the transverse connecting portion 3 of the heating chamber, and the other two, 20 and 21, connecting with fuel ports 22 and 23, respectively, that admit fuel to the passages 4 and 5. Valves 19', 20' and 21', respectively, are arranged in the box 18 and control the flow of gas through the respective branches 19, 20 and 21, each of these valves being operable in any suitable way, for instance, by the mechanism shown in Fig. 5, and hereinafter described in detail.

The drafting of the furnace shown in Figs. 3 and 4 may be effected in a manner similar to that employed with the furnace shown in Figs. 1 and 2, that is, by the connection of each of the regenerator passages 6' and 7' to an independent Venturi duct or tube 24. A blower 25 supplies air to both of the ducts 24 by connection of its outlet to a blast box 26, common to both ducts. The box 26 has communication through opposite lateral openings 27, 27 (only one being shown) with the two hollow casings 28, 28 that connect with the lower ends of the two Venturi ducts 24, 24. Projecting upwardly through each of these casings 28, 28 is the short tubular extension 29 of the corresponding regenerator passage 6' or 7', said extension 29 at its upper end telescoping within the lower end of the corresponding Venturi duct 24 and being spaced therefrom to provide an annular upwardly directed nozzle for the discharge of air into the duct from its blast casing 28. Each of the ducts 24, 24 is equipped with a suitable valve or damper 30, having a link connection 31 to an operating lever 32. Each lever 32 has connected thereto also a sliding plate or damper 33 which, as shown in Fig. 4, controls the effective area of the port or passage 27, by which the associated casing 28 communicates with the blast box 26. Air from said blast box 26 is also preferably taken through a tube or conduit 34 to the transverse portion 3 of the heating chamber, to support combustion of the fuel admitted at that point by way of branch 19; a suitable valve or damper 35 in the tube 34 can be operated, in any suitable manner, to control the volume of air thus supplied to the auxiliary heating means.

The operation of the furnace shown in Figs. 3 and 4, when the flow of gases therethrough is in the direction of the arrows, involves closure of the gas valve 21', so that no fuel is supplied to the ports 23 in passage 5; the gas valve 20' however is open, for the passage of fuel to the ports 22, and the combustion of said fuel so admitted to the passage 4 is supported by air which is blown inwardly through the regenerator passages 6 and 6', owing to the fact that the associated damper 30 in the duct 24 of said passages is closed, as shown in Fig. 4. The closure of said damper 30 is accompanied by a partial throttling of the air thus supplied, by lowering the plate 33 to reduce the effective area of port 27. Under these conditions, the other damper 30, in the Venturi duct 24 that connects with the regenerator passages 7 and 7', is practically wide open, as shown in Fig. 3; in this position of the damper, the associated slide 33 gives a practically full opening of its port 27, so that a relatively large volume of air is supplied upwardly in an annular jet to exert a strong entraining action on the products of combustion through the regenerator passages 7 and 7', for their discharge to the atmosphere from the associated duct 24. To reverse such a furnace, it is only necessary to open the gas valve 21', close the gas valve 20', and reverse the positions of the two dampers 30, 30, so that air will flow inwardly through the regenerator passages 7 and 7' and combustion products will flow outwardly through the regenerator passages 6 and 6',—the flow in this case being in the opposite direction from that indicated by the arrows in Figs. 3 and 4. In both phases of furnace operation, auxiliary heating in the transverse portion 3 of the heating chamber is the same, so that no manipulation of the gas valve 19' or the air damper 35 is necessary to effect reversal.

Any suitable means for operating the several valves and dampers may be employed; by way of example, in Fig. 5, I have shown a mechanism applicable to each of said valves and dampers for procuring its opening or closing movements and for permitting its adjustment. Said mechanism consists, as shown, of a suitable cylinder 36 having therein a piston 37, to the rod of which may be connected the stem of the valve to be operated, or in the case of a damper 30, the operating rod 38 for the lever 32. Fluid under pressure can be admitted or exhausted from either end of the cylinder 36 by means of the piping and valves illustrated at 39, so as to produce, as desired, the opening or closing movements of the associated valve or damper. In addition, the valve when in open position, corresponding to the upper position of the piston 37, may be adjusted, to partially throttle the flow of fuel or air, as the case may be, by the lowering action on said piston 37 of a screw 40, operated by a hand wheel 41.

I claim:

1. In a heating furnace, the combination with regenerator passages in side-by-side relation, and used alternately for the inflow of air to and the outflow of combustion products from said furnace, of an outwardly opening duct associated with each passage, means for supplying air to both of said ducts, a damper in each duct adapted when closed to direct said air inwardly to the furnace, and means operable by the closure of said damper to throttle the air supplied to its duct thereby to reduce the amount of air supplied to the furnace for fuel combustion, as compared to the amount of air used for the entrainment and discharge of waste gases through the other duct.

2. In a regenerative heating furnace, the combination, with a pair of regenerator passages in side-by-side relation, of an outwardly-opening duct associated with each passage, an air-supply means common to both ducts, each of the latter, at its juncture with said air-supply means being in spaced telescopic relation to the end of its associated regenerator passage, whereby to form an annular nozzle for the passage of air into said duct, a damper in each duct beyond said nozzle, and means operable by the closure of said damper to reduce the amount of air passing from said air-supply means to the annular nozzle associated with said damper.

3. In a regenerative heating furnace, the combination, with a pair of regenerator passages in side-by-side relation with their inner ends connected to opposite sides of a heating chamber, of an outwardly-opening duct associated with each passage, an air-supply means common to both ducts, each of the latter, at its juncture with said air-supply means being in spaced telescopic relation to the end of its associated regenerator passage, whereby to form an annular nozzle for the passage of air into said duct, a damper in each duct beyond said nozzle, means operable by the closure of said damper to reduce the amount of air passing from said air-supply means to the annular nozzle associated with said damper, and a direct connection from said air-supply means to said heating chamber, to supplement the air for the support of combustion supplied through that regenerator passage whose associated duct has its damper in closed position.

4. In a regenerative heating furnace, the combination with a pair of regenerators in side-by-side relation, of a pair of heating chambers communicating with the adjacent inner ends of said regenerators, a passage connecting the other ends of said heating chambers, fuel and air supply means associated with each regenerator and used alternately, whereby in the operation of the furnace the outflow of combustion products is alternated between said regenerators, and means for supplying auxiliary air to the connecting passage between said two heating chambers, whereby said auxiliary air is effective for supporting combustion of fuel within the furnace regardless of which of the two fuel supply means is in use.

5. In a regenerative heating furnace, the combination with a pair of regenerators in side-by-side relation, of a pair of heating chambers communicating with the adjacent inner ends of said regenerators, a passage connecting the other ends of said heating chambers, fuel and air supply means associated with each regenerator and used alternately, whereby in the operation of the furnace the outflow of combustion products is alternated between said regenerators, and means for supplying auxiliary air and fuel to the passage connecting said two heating chambers, whereby the resulting combustion products are free to pass to whichever regenerator is serving for the outflow of combustion products from the furnace.

Dated this sixteenth day of September, 1929.

GEORGE H. ISLEY.